United States Patent [19]
Smith

[11] 3,848,919
[45] Nov. 19, 1974

[54] OPHTHALMIC SCREEN FOR MOTORISTS

[76] Inventor: Robert Smith, 555 Elmwood Ter., Rochester, N.Y. 14620

[22] Filed: May 8, 1969

[21] Appl. No.: 823,025

[52] U.S. Cl. .............................................. 296/97 F
[51] Int. Cl. ............................................... B60j 3/04
[58] Field of Search ........ 296/97, 97 R, 97 E, 97 H, 296/97 F; 350/276, 316

[56] References Cited
UNITED STATES PATENTS

| | | | |
|---|---|---|---|
| 2,382,875 | 8/1945 | Handley | 296/97.12 |
| 2,410,171 | 10/1946 | LeLande | 296/97.21 |
| 2,605,133 | 7/1952 | Newton | 296/97.55 |
| 3,142,508 | 7/1964 | McHugh | 296/97.19 |
| 3,282,623 | 11/1966 | Paro | 296/97 |

FOREIGN PATENTS OR APPLICATIONS

| | | | |
|---|---|---|---|
| 508,454 | 1/1952 | Belgium | 296/97.68 |
| 43,650 | 2/1931 | Denmark | 296/97.55 |
| 572,565 | 1/1924 | France | 296/97.55 |
| 427,529 | 1/1967 | Switzerland | 296/97.55 |

*Primary Examiner*—Benjamin Hersh

[57] ABSTRACT

An elongated light-filtering panel, positioned lengthwise horizontally at the windshield of a motor vehicle, to be looked through by the driver, is supported on means affording adjustments in various directions. A plurality of opaque overlapping panels block out most of the main panel's central area commencing at its bottom edge; such area being an upright trapezoid with top edge horizontal. Said opaque panels are relatively shiftable to change the base lengths and the side slopes of said trapezoidal area, but whose altitude remains a constant. A vertically adjustable transparent panel extending along and upward from the main panel, presents a top horizontal visible edge.

7 Claims, 5 Drawing Figures

PATENTED NOV 19 1974 3,848,919

INVENTOR,
Robert Smith,
BY
ATTORNEY.

OPHTHALMIC SCREEN FOR MOTORISTS

The present invention relates to ophthalmic screen devices for the drivers of motor vehicles to look through, and more particularly to the type mounted at the windshield.

Prior devices in this art concerned themselves only with the elimination of glare and dazzle. However, further detailed consideration of the problems affecting sight, especially because of the high speeds of modern motor travel, another grevious cause of visual fatigue and the incident objectionable physiological and phychological effects resulting therefrom, is the damaging fatigue caused by the long continuous exposure of the driver's visual system to the movement of images across the visual field, as the apparent motion of the road, road markers, defects in the road, lane markers and the like, rapidly towards him.

A flagrant example which will strongly illustrate and give quick understanding of the deteriorating effect of rapid motion of an image towards the driver, it is best to recall watching a movie showing a locomotive coming rapidly towards the observer until the whole screen is filled with a front view of the locomotive. The observer is caused to experience severe bodily disturbances. The driver of a fast moving vehicle will be continually subjected to a similar uncomfortable and damaging effect which could bring on a dangerous impairment of the driver's judgment, slow his reaction and capacity to perform the required manipulations of driving, bring on drowsiness and even sleep, and seriously confuse his judgment of motion and distance, and harm his physical attitude and feelings, and bring on involuntary saccades and cause accidents.

It is therefore the principal object of this invention to provide a novel ophthalmic screen device which will eliminate the foregoing objectional effects, improve the visional environment of vehicle drivers, and substantially obviate visual fatique of the character discussed, besides serving to reduce glare and dazzle.

A further object of this invention is to provide a novel screen of the kind set forth, affording evaluation of the speeds and closing distances between the driver's vehicle and other vehicles and obstacles ahead of him on the road.

Another object thereof is to provide a novel ophthalmic device for screening out the motion effects mentioned which occur in the complete width of the lane traveled, and which affords a means to evaluate the position of the vehicle across the lane, and further to include adjustment means to accommodate lanes of different widths, and also adjustment means to properly position such screen to suit the particular driver.

Still another object of this invention is to provide a novel screen device of the character described, having the mentioned attributes, and which is simple in construction, reasonable in cost to manufacture, suitable for vehicles of all types and sizes, easy to adjust, and which is efficient in carrying out the purposes for which it is designed.

Other objects and advantages will become apparent as this disclosure proceeds.

For one practice of this invention, the screen device comprises a light-filtering main panel, of elongated form which is an upright isosceles trapezoid, to be positioned horizontally inside the vehicle at the windshield to be looked through by the driver. The top edge of said panel shall be horizontal. This main panel is supported on a bracket adapted to be mounted on the cowl, and affording up, down, fore, aft and swingable adjustments. Most of the central area of said main panel is covered by a series of overlapping opaque panels commencing from its bottom edge; said area being of upright trapezoidal form with the top edge horizontal. Said opaque panels are relatively movable to change the lengths of the bases and the angle of convergence of the side edges of said trapezoid. The altitute remains constant. Said series consists of a central panel fixed on the main panel, and movably mounted side extension panels, each of the latter at their distal edge regions having swingably mounted panels. There is a vertically movable horizontally elongated panel extending along the top edge of the main panel, presenting a viewable top horizontal edge. The entire screen device is flat and thin.

In the accompanying drawing forming part of this specification, similar characters of reference indicate corresponding parts in all the views.

Figure 1:
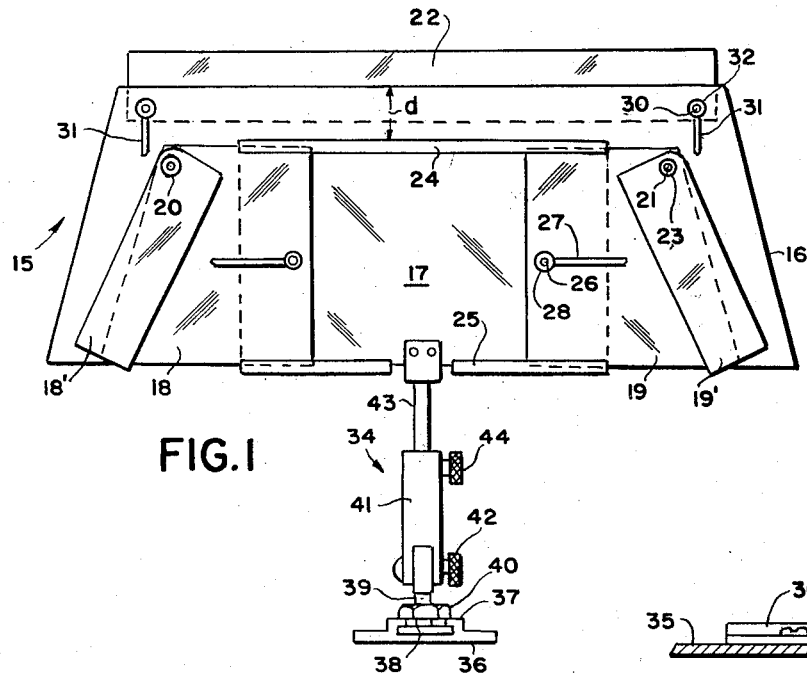
FIG. 1 is an elevational view of the looked-at face of one form of ophthalmic screen device embodying the teachings of this invention.
Figure 2:
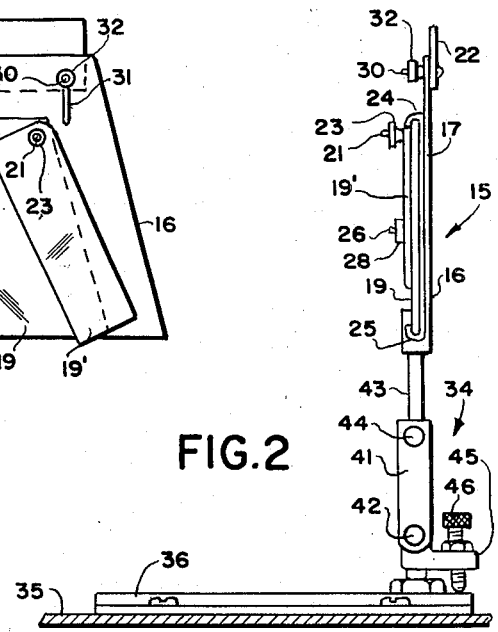
FIG. 2 is a side view of FIG. 1, showing the screen mounted on the cowl of an automobile.

In the drawing, the screen device of preferred construction, designated generally by the numeral 15, comprises preferably the upright isosceles trapezoidal shaped optical filter main panel 16, the major part of whose central area commencing from its bottom edge, is covered by a plurality of overlapping, high density or opaque panels, which are relatively shiftable to change said covered area. The filter panel 16, is practical to be of a density of approximately 1.0 and of green or neutral color for example. All the panels may be of glass or plastic sheeting. The central covering panel 17 may be a coat of paint, and it is found practical that said panel 17 and its extensions 18 and 19, shall be of sheet metal as aluminum, and if desired, said panel 17 may be of a colored glass or plastic of graded density which decreases upwardly which is a material well known in optical devices, and is believed well known to those versed in these arts. In the embodiment illustrated, said central covering panel 17 which is fixed to the main panel 16, is rectangular, while each of its side extension panels 18 and 19, have the shape of a right angled trapezoid. Said covering and its extensions, define an upright approximately isosceles trapezoid similar to panel 16, each of whose base angles is about 75 degrees. Each extension panel, at its distal free end, has a swingable wing panel, pivoted thereto at the region of its upper outer vertex, and is adapted to overlay the side edge region of the extension panel associated therewith, but can be swung to change the base angle of the covered area on the panel 16. Each wing panel may be rectangular and they are indicated respectively as 18' and 19', and their axes of swing at 20 and 21, may be offered by a screw extending from the associated extension panel, provided with a knurled nut 23 to secure the wing in any set position. The central panel 17, is bent over along its upper and lower edges to provide channel tracks 24,25 for extension panels to slide in, and said extensions may be releasably fixed at any position for which a screw as 26 from the central panel 17 through a horizontal slot as 27 in the extension panel, is provided with a knurled nut as 28. All of the opaque panels are shown on the face of the screen 15, being viewed by the driver of the vehicle 29. Said composite screen is thin and flat. The numeral 22 denotes a colorless transparent plastic panel extending upwardly along the upper edge of the main panel, and arranged for vertical adjustment by means of screws as 30 extending therefrom through vertical slots as 31 in the main panel; the position of said panel 22 being releasably set by means of the knurled nuts as 32.

Figure 4:
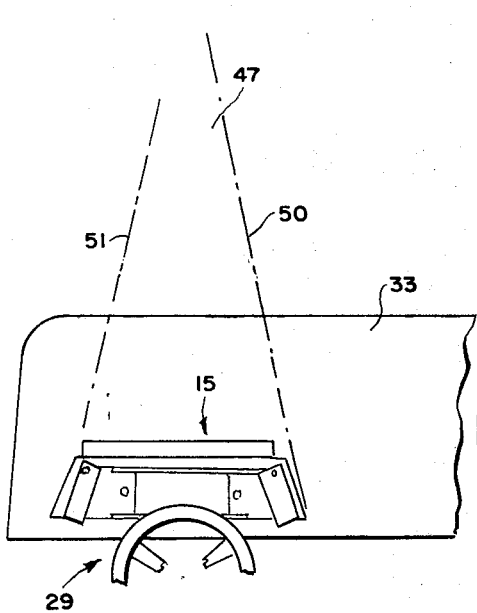
FIG. 4 is a fragmentary diagrammatic view showing the screen at the windshield in front of driver's position and indicating the lane being travelled on as seen by the driver. The panels of the screen are shown set to suit this lane.
Figure 3:
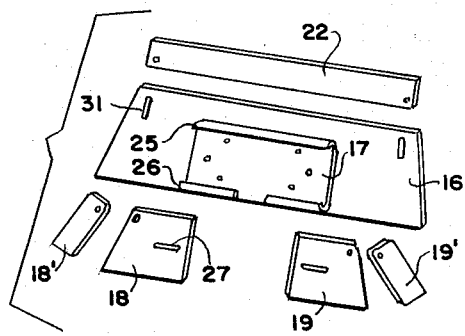
FIG. 3 is a perspective "exploded" view of the panels included in the screen structure of FIG. 1.
Figure 5:
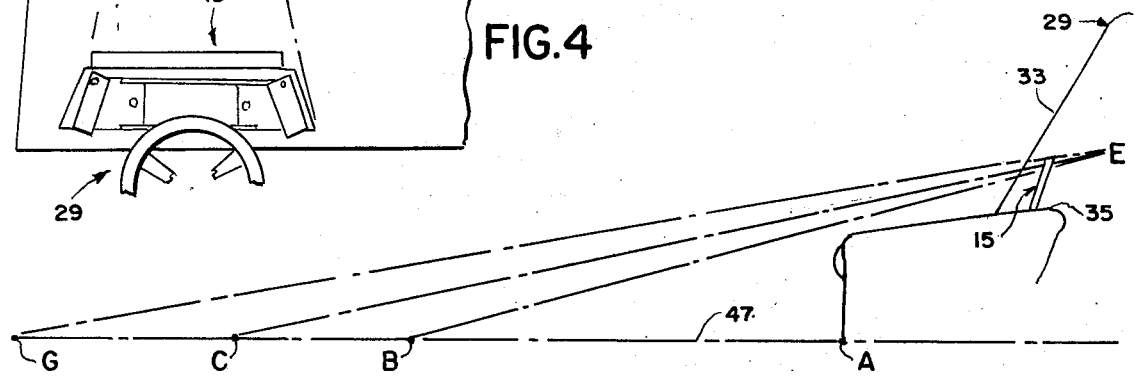
FIG. 5 is a fragmentary diagrammatic side view of the vehicle equipped with the screen device, with indication of successive zones along the road involved in the operation and use of the said device.

When the screen device is in use as in FIGS. 4 and 5, it is essential that the upper edges of the main panel 16, the central panel 17 and the upward extending clear panel 22, shall be horizontal. Of course, said upper edges are parallel in the first place. Further, said screen device shall be properly positioned to suit the driver, centrally in front of him at the windshield 33, for him to look through so he can have the advantages offered by said screen device.

In the embodiment illustrated, the screen device is shown supported at the middle of its bottom edge region, by an ajustable stand bracket indicated generally as 34, mounted on the cowl 35 of the vehicle 29. Said bracket comprises a base 36 which is mounted on the cowl, offering a track 37 for fore and aft movement of a slide 38, having a screw post 39 extending upwardly therefrom, which has a lock nut 40 to releasably secure the slide's position in its track. Said post is swivelled to the lower end of a tubular element 41, about an axis screw having a tightening nut 42; such axis of swing being parallel to the top edge of the main panel 16. A clevis at the upper end of a rod 43, is riveted to the central bottom end region of the screen, and said rod is in telescopic relation with said tubular element 41, and there is the set screw 44 to hold any set telescopic relation. A lug 45 extending laterally from the element 41, is provided with an adjustable screw means 46, to serve as a stop to determine the tilt of the screen device 15, when swung up for use.

The position of the screen 15 in relation to the driver, and dimensions of the components thereof are so chosen that the light from the road 47 immediately in front of the vehicle 29, is intercepted by the opaque panels, and does not reach the driver's eyes. The very rapidily apparent moving road and its marks in the zone AB are very distracting and optically distressing if allowed to be viewed, but with the use of this screen 15, are avoided across the visual field. The position of the upper edge of the panels 17,18,19 should be such that the distance AB is from about 40 to 60 feet. The distance *d* between the upper edges of the light-filtering panel 16 and the opaque panels 17,18,19, should be such that the light from the road in the zone BC shall pass through the screen; said zone BC also being a distance between 40 to 60 feet, but the apparent movement of the road as viewed through the distance *d*, is tolerable and produces no vexing influence. The top edge of the transparent panel 22 is discernable to the driver, and should be at such height as to determine the line G across the road; the distance AG being about 300 feet. Of course, the driver has clear view of the road as viewed from above the screen, all the way to the horizon. The side end portions of the filter panel 16, are of such width that the driver can see the left and right hand forward sides of the vehicle. It is evident that the driver can judge the distance of anything on the road in front of him, in view of his knowledge of said zone lengths. Guidance for lateral positioning is provided by adjusting the swingable wings 18',19' so that their slopes shall conform approximately to the perspective view of the shoulder 50 of the road, or the lane marker on the right of him, and the center line of the road or lane marker 51 on the left side as seen by the driver. While the driver is monitoring the road as viewed from above the upper edge of the filtering panel 16, he can with the use of the guiding facilities offered by the screen 15, obtain by means of his peripheral vision, enough information to guide his vehicle for a large part of the time, and only occasionally must he fixate on the road near him by looking through the transparent portions of the screen to obtain further positional and guidance information.

In installing a screen, the driver seated, makes necessary adjustments of the bracket means 34, to suit his eyelevel, distance in front of the screen, and the angle of tilt of the screen which is practical to be about 70° upwardly towards him, and that the position of the upper edge of the panel 16, and the height of the panel 22, shall be such that the positions of A, B and G are attained. Once installed to suit the driver of the vehicle, then along any extended trip, he will adjust the extension panels 18,19, and their wing panels 18',19', to suit the stretch of road he is travelling on. If road widths change on the way, he will readjust said movable panels to suit. When the screen is not to be used, he can swing it down, and rely upon the initial adjustment of the stop set by 46, to get it again in the desired use position, or he can release the screw 44, and lift the screen 15 out. Other means may be provided to mount the screen at the windshield 33, as for instance by a bracket extending from some other part of the vehicle's interior, or it may be mounted by means of suction cups, and retraction may be afforded into a casing entrance understandable, the cowl's ledge, all of which is readily underatandable, but not shown.

For many types of automobiles, it is practical to have the height of the panel 16, to be about 6 to 7 inches, and its base length about from 15 to 18 inches, and the unobstructed upper and side regions from about 1 to 1¼ inches. All other screen panels will be about in the relative sizes they appear in FIG. 1 of the drawing.

It is to be noted, that all dimensions herein stated are merely matters of suggestion and not mandatory, but should be made to suit driver size, vehicle dimensions and to attain the locations of points determining the several zones in front of the vehicle, so the screen shall be capable of its stated capabilities and functions.

This screen 15 is both for daytime and night time use. The exposed parts of the screen 16 afford elimination of glare and dazzle. The use of this screen is not intended for slow travel and city driving, but on long stretches of road traveled at comparatively high speeds.

This invention is capable of numerous forms and various applications without departing from the essential features herein disclosed. It is therefore intended and desired that the embodiments shown herein shall be deemed merely illustrative and not restricted to the showing herein.

I claim:

1. An opthalmic screen device of the character described, at the lower part of the windshield of a motor vehicle, directly in front of the driver, comprising a light-filtering panel member of relatively low density, a light-shielding member of comparatively high density covering only the major central part of said panel inward of its top and side edges and starting substantially from the bottom edge of said panel, whereby said panel is unobstructed in a predetermined top zone extending from side to side and in predetermined zones along its sides, extending from top to bottom thereof; the upper edges of said members being horizontal, said light shielding member comprising a central area and two horizontally slidably mounted panels overlapping said central area, one at each side thereof, and means extending from the screen for mounting onto the vehicle.

2. An ophthalmic screen device as defined in claim 1, wherein said central area together with its extensions comprise substantially an isosceles trapezoidal form of substantially constant altitude regardless of the positions of said extensions.

3. An ophthalmic screen device as defined in claim 2, including two light-shielding wing panels of relatively high density, overlapping the remote end regions of said extensions respectively and swingably mounted thereon respectively at the upper vertex of the associated extension panel; the remote side edges of said wing panels being straight.

4. An opthalmic screen device of the character described, at the lower part of the windshield of a motor vehicle, directly in front of the driver, comprising a light-filtering panel member of relatively low density, a lightshielding member of comparatively high density, covering only the major central part of said panel inward of its top and side edges and starting substantially from the bottom edge of said panel, whereby said panel is unobstructed in a predetermined top zone extending from side to side, and in predetermined zones along its sides, extending from top to bottom thereof, the upper edges of said members being horizontal, two light-shielding wing panels of relatively high density, overlapping respectively the side edges of said light-shielding member and and swingably mounted on the screen at the upper vertex of the light-shielding member thereat; the remote side edges of said wing panels being straight; said wing panels on being moved altering the size of said central part and the slopes of its sides, without change in its altitude, and means extending from the screen for mounting onto the vehicle.

5. An opthalmic screen device of the character described, at the lower part of the windshield of a motor vehicle, directly in front of the driver, comprising a light-filtering panel member of relatively low density, a light-shielding member of comparatively high density, covering only the major central part of said panel inward of its top and side edges and starting substantially from the bottom edge of said panel, whereby said panel is unobstructed in a predetermined top zone extending from side to side, and in predetermined zones along its sides, extending from top to bottom thereof; the upper edges of said members being horizontal , an element carried on the screen, presenting a discernable top edge which is parallel along and spaced upwardly from the top edge of the light-filtering panel member; said space allowing substantially unobstructed passage of light therethrough, and means extending from the screen for mounting onto the vehicle. horizontal, 6. An ophthalmic screen device as defined in claim 5, wherein said element is vertically slidable on the screen.

7. An ophthalmic screen device as defined in claim 5, wherein said element is a colorless transparent panel.

\* \* \* \* \*